United States Patent
Forster et al.

(10) Patent No.: US 9,541,216 B2
(45) Date of Patent: Jan. 10, 2017

(54) EXTERNALLY FITTED CONTROL DEVICE AND HYDRAULIC CONTROL MODULE FOR AN EXTERNALLY FITTED CONTROL DEVICE

(71) Applicant: ZF Friedrichshafen AG, Friedrichshafen (DE)

(72) Inventors: Kathrin Forster, Tettnang (DE); Michael Riedhammer, Bermatingen (DE); Jochen Schneider, Neukirch (DE); Oliver Bayer, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 251 days.

(21) Appl. No.: 14/330,069

(22) Filed: Jul. 14, 2014

(65) Prior Publication Data
US 2015/0047731 A1    Feb. 19, 2015

(30) Foreign Application Priority Data

Aug. 15, 2013   (DE) .................. 10 2013 216 216

(51) Int. Cl.
*F16K 31/42*     (2006.01)
*G05D 16/20*     (2006.01)
*F16H 61/00*     (2006.01)
*F16H 61/30*     (2006.01)

(52) U.S. Cl.
CPC ......... *F16K 31/426* (2013.01); *F16H 61/0003* (2013.01); *F16H 61/0009* (2013.01); *G05D 16/202* (2013.01); *F16H 2061/308* (2013.01); *Y10T 137/86614* (2015.04)

(58) Field of Classification Search
CPC .................................... F16H 61/0003
See application file for complete search history.

(56) References Cited

U.S. PATENT DOCUMENTS

2013/0033098 A1*   2/2013  Nagashima ............. B60T 7/042
                                                 303/199

FOREIGN PATENT DOCUMENTS

| DE | 197 57 864 C1 | 6/1999 |
| DE | 103 08 560 A1 | 9/2004 |
| DE | 10 2005 028 122 A1 | 12/2006 |
| DE | 10 2011 009 215 A1 | 7/2012 |
| DE | 10 2011 088 031 A1 | 6/2013 |

OTHER PUBLICATIONS

German Search Report Corresponding to 10 2013 216 216.2 mailed May 20, 2014.

* cited by examiner

*Primary Examiner* — Derek D Knight
(74) *Attorney, Agent, or Firm* — Davis & Bujold, PLLC; Michael J. Bujold

(57) ABSTRACT

The externally fitted control device includes an electronic control module (1), a hydraulic control module (2) and a common control enclosure (3). The hydraulic control module (2) has electromagnetic actuators (10) and control pistons (14) which are positioned on top of one another to result in a compact design which is safe to operate and can be manufactured economically.

12 Claims, 5 Drawing Sheets

EXTERNALLY FITTED CONTROL DEVICE AND HYDRAULIC CONTROL MODULE FOR AN EXTERNALLY FITTED CONTROL DEVICE

This application claims priority from German patent application serial no. 10 2013 216 216.2 filed Aug. 15, 2013.

FIELD OF THE INVENTION

The present invention relates to an externally fitted control device and a hydraulic control module for an externally fitted control device.

BACKGROUND OF THE INVENTION

In particular, electronic control devices, which are positioned either in the inside of a transmission enclosure, so-called integrated control devices, or mounted at the outside of the transmission enclosure, so-called externally fitted control devices, are used for the control of transmissions.

DE 10 2011 088 031 A1 teaches an integrated control device which has an electronic control module and a hydraulic control module.

Transmissions which require an externally fitted control device and which are also considered smaller transmissions, due to their dimensions, have often just surfaces for fitting the external control device which only allow externally fitted control devices with small dimensions. Since the externally fitted control devices must contain the electronic control module, as well as the hydraulic control module and also contain electromagnetic actuators, such as pressure controls and shift valves, pressure holding valves, pressure reduction valves, alternating valves or similar, and the local electronic is near the valve block, they become very long and require distribution of the valves within several valve blocks, in order to maintain the base area of the individual switching devices at a smaller size.

SUMMARY OF THE INVENTION

The present invention has the task of creating an externally fitted control device and a hydraulic control module, for an externally fitted control device, which has a compact design, is safe to operate, and which can be manufactured economically.

The task is solved through a generic externally fitted control device with a hydraulic control module for the externally fitted control device in accordance with the characteristics of the main claim.

In accordance with the invention, the hydraulic control module has ducts for guiding pressurized fluid, electromagnetic actuators, and control pistons, whereby the electromagnetic actuators are spaced from the control piston.

Because of the fact that the valves are not only positioned next to one another but also on top of one another, a two level and compact construction is created which allows a reduction of the base area of the hydraulic control module. Thus and for instance, electro-magnetic actuators, so called pressure controls, can be physically separated from the shift valves which are usually positioned coaxially behind the pressure controls, by positioning the electromagnetic actuators on a first level and the control pistons, also called shift valves, are positioned on a second level whereby the first level is spaced from the second level. The hydraulic control module hereby has an enclosure which can be designed as one piece or as a multi-piece, for instance, as an enclosure which has two parts. This enclosure is often manufactured by means of metal, for instance by casting. The enclosure, which is designed as one piece part, has ducts which belong to the first level and ducts which belong to the second level. The enclosure has a first surface through which the enclosure is connectable with the transmission enclosure, and a second surface which can be sealed fluid tight by means of a cover. If two enclosure parts are used, the opening of the ducts of the upper enclosure part is screwed to the lower enclosure part whereby the cover can be omitted. To manufacture the hydraulic control module economically, the enclosure of the hydraulic control module is not additionally treated with regard to tightness, which can for instance be achieved through a so-called impregnation, to seal the enclosure which is manufactured by casting. Instead, the hydraulic control module is surrounded by an additional controlled enclosure which can be connected with a transmission enclosure in a way so that it is fluid tight, whereby any leakage which exits from the control module remains within the control enclosure.

The control enclosure is designed in a way so that the electronic control module, as well as the hydraulic control module, are positioned in the common control enclosure. Therefore, the control enclosure creates a space in which the electronic control module and the hydraulic control module are positioned. In a further embodiment, the common control enclosure has a separating wall through which the space is separated into two subspaces, whereby the electronic control module is positioned in one subspace and the hydraulic control module in the other subspace. The separating wall can be designed in a way that the electronic control module can be attached thereto.

The common control enclosure can have a cover in the area of the electronic control module through which, in the case of required service, the electronic control module can be accessed in a simple way.

Through the use of the hydraulic control module, in which the valves are not only positioned next to one another but also on top of one another and in a common control enclosure in which all of the electronic control module is positioned, an externally fitted control device is created which has a compact design and can be manufactured economically.

BRIEF DESCRIPTION OF THE DRAWINGS

Further characteristics can be seen in the description of the drawings.

It shows

DETAILED DESCRIPTION OF THE PREFERRED EMBODIMENTS

Figure 1:
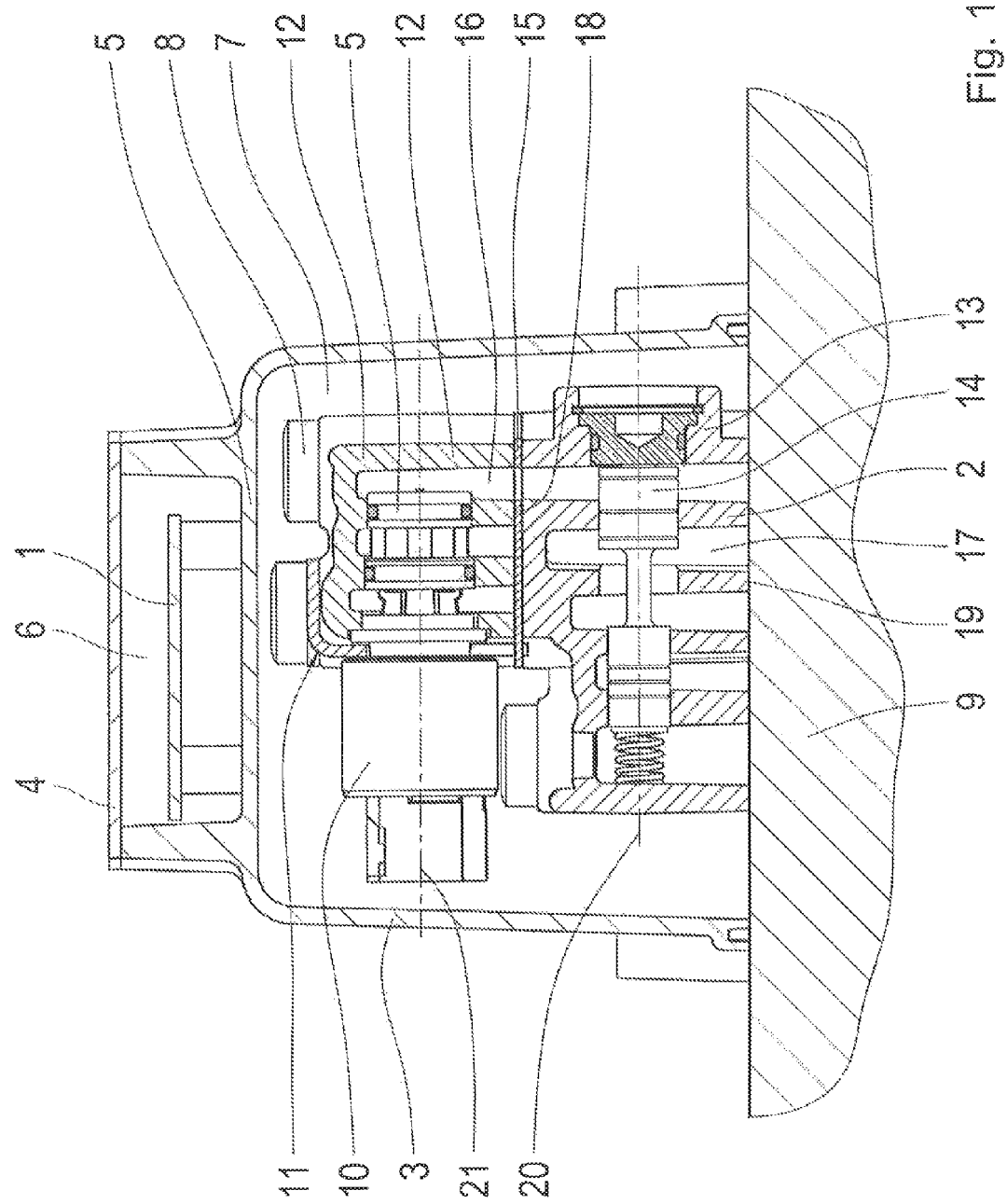
FIG. 1 an externally fitted control device, with a hydraulic control module, comprising two enclosure parts with electromagnetic actuators.

FIG. 1:

The externally fitted control device comprises an electronic control module 1, a hydraulic control module 2, and a common control enclosure 3. The common control enclosure 3 can be locked by means of a cover 4. A separating wall 5 separates the inner part of the common control enclosure 3 into a first subspace 6 and into a second subspace 7. The electronic control module 1 is positioned within the first subspace 6 and the hydraulic control module 2 is positioned within the second subspace 7. The hydraulic control module 2 can be connected to a transmission enclosure 9 via connecting elements 8, for instance screws. The common control enclosure 3 can also be connected with the transmission enclosure 9 through connecting elements, which are not shown, which create a fluid tight seal with the environment. The hydraulic control module 2 has one or more electromagnetic actuators 10 which are secured by means of an actuator fixture 11. The electromagnetic actuator 10 is located in the first enclosure part 12 and the control piston 14, which is also called a proportional control pressure valve, is positioned in the second enclosure part 13. A gasket 15 is positioned between the first enclosure part 12 and the second enclosure part 13. This gasket 15 can also be designed in a way that the pressurized fluid streams, from the first enclosure part 12 to the second enclosure part 13, are dampened by means of the gasket 15 and dimensions of the respective openings, or if it assumes the role of a shutter. Ducts 16 are positioned, in order to create them, in the first enclosure part 12 in which their openings at the surface 18 attaches to the gasket 15 and therefore reside on the second enclosure part 13. The second enclosure part 13 has ducts 17 which, in order to produce them, are open to the surface 19 which resides on the transmission enclosure 9.

A plane 20 is spaced from a plane 21 and thus the control piston 14 is spaced from the electromagnetic actuator 10 and thus, viewed from the surface 19, the electromagnetic actuator 10 is positioned above the control piston 14. Because the electromagnetic actuator 10 is not coaxially positioned with the control piston 14, the externally fitted control device can have a compact design.

Figure 2:
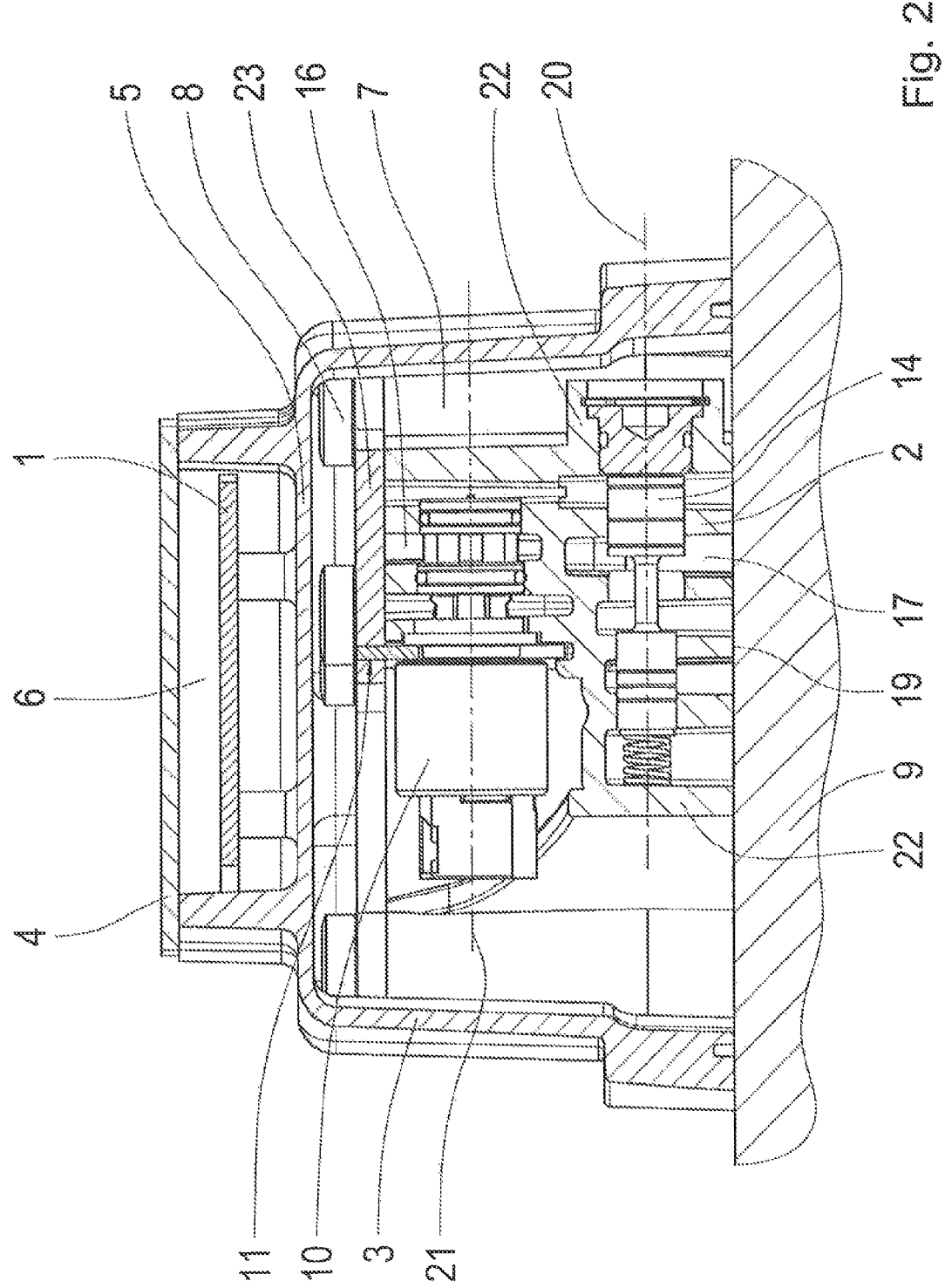
FIG. 2 an externally fitted control device, with a hydraulic control module, with a one-piece enclosure part and electromagnetic actuators.

The FIG. 2 differs from the FIG. 1 in a way that the hydraulic control module 2 has a one-piece enclosure part 22 which is sealed by means of a cover 23.

Figure 3:
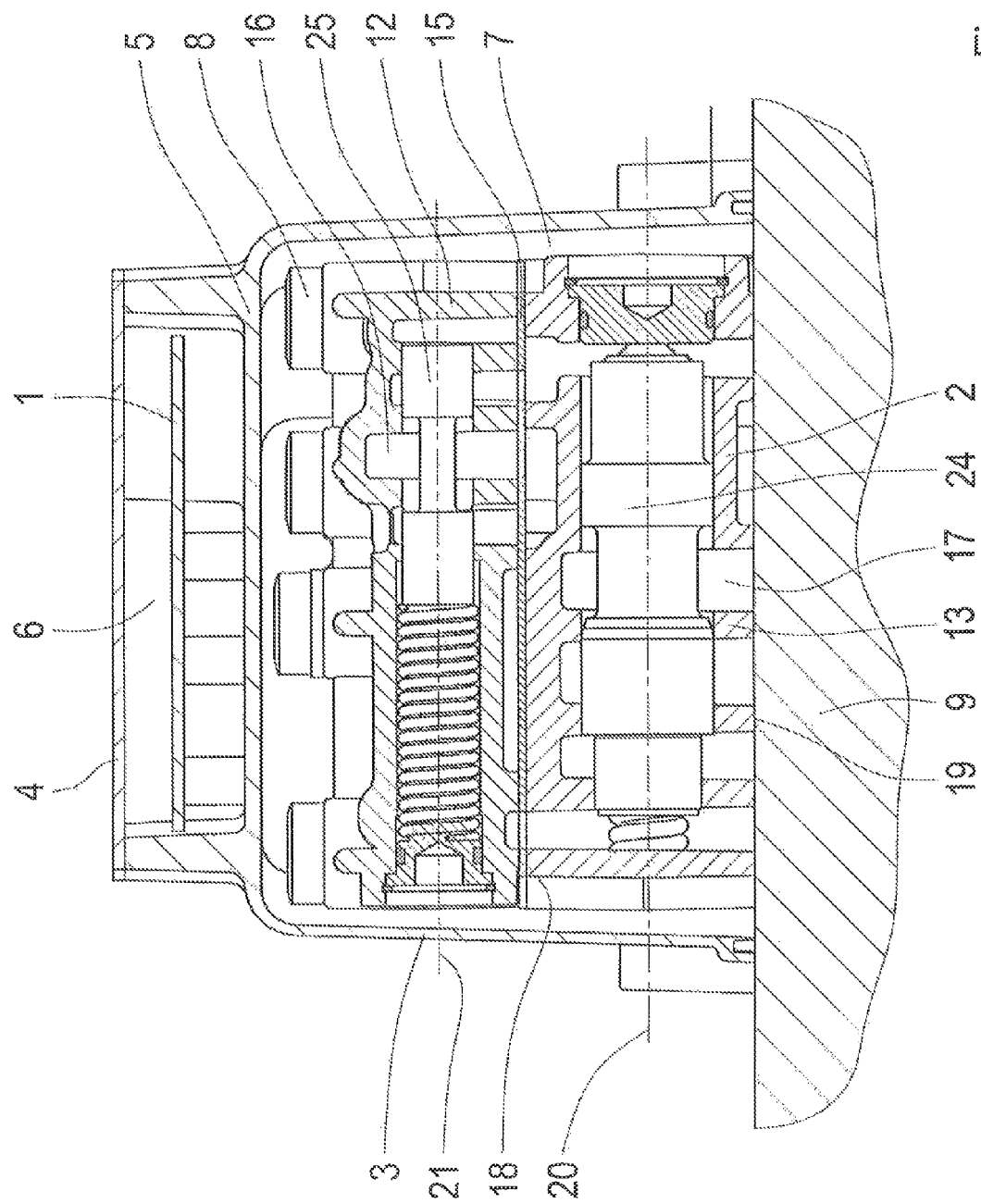
FIG. 3 an externally fitted control device, with a hydraulic control module, with two enclosure parts and main pressure valves and pressure reduction valves.

FIG. 3:

The externally fitted control device in FIG. 3 differs from the externally fitted control device in FIG. 1 in a way that a main pressure valve 24 and a pressure reduction valve 25 are implemented instead of the electromagnetic actuated 10 and the control piston 14.

Figure 4:
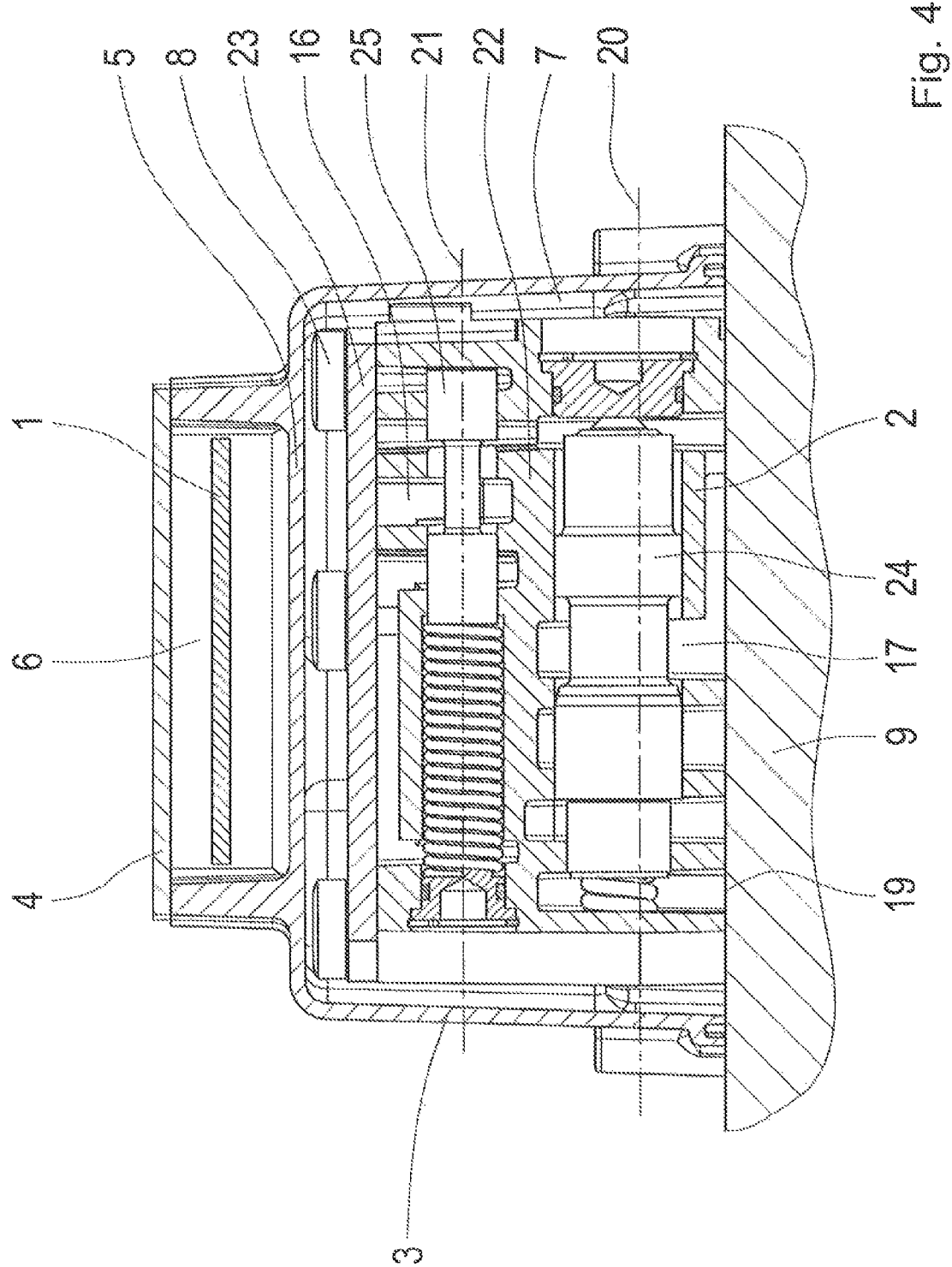
FIG. 4 an externally fitted control device, with a hydraulic control module, with a one-piece enclosure part and main pressure valves and pressure reduction valves.

FIG. 4:

The externally fitted control device in FIG. 4 differs from the externally fitted control device in FIG. 2 in a way, that the electromagnetic actuated 10 and the control present 14 are replaced by a main pressure valve 24 and a pressure reduction valves 25.

Figure 5:
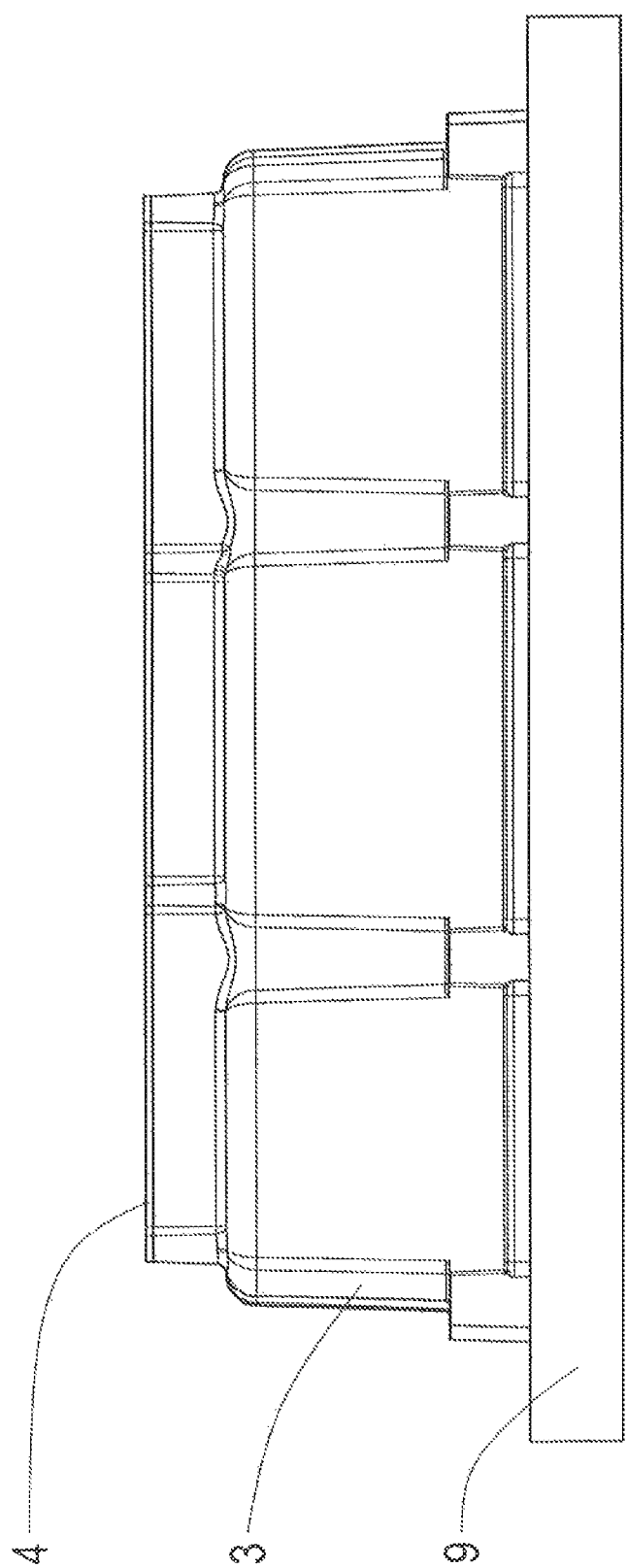
FIG. 5 an external view of the externally fitted control device.

FIG. 5 is an external view of the externally fitted control device according to the present invention.

REFERENCE CHARACTERS

1 Electronic Control Module
2 Hydraulic Control Module
3 Common Control Enclosure
4 Cover
5 Separating Wall
6 First Subspace
7 Second Subspace
8 Connection Elements
9 Transmission Enclosure
10 Electromagnetic Actuator
11 Actuator Safety Part
12 First Enclosure Part
13 Second Enclosure Part
14 Control Piston
15 Gasket
16 Ducts
17 Ducts
18 Surface
19 Surface
20 Plane
21 Plane
22 Enclosure Part
23 Cover
24 Main Pressure Valve
25 Pressure Reduction Valve

The invention claimed is:

1. An externally fitted control device comprising:
an electronic control module (1) and a hydraulic control module (2);
the electronic control module (1) and the hydraulic control module (2) both being positioned in a common control enclosure (3);
the common control enclosure (3) being connected fluid tight with a transmission enclosure (9) so as to create a fluid tight space with respect to an external environment in which the electronic control module (1) and the hydraulic control module (2) are positioned; and
the hydraulic control module (2) including control pistons (14), electromagnetic actuators (10), and ducts (16, 17) for guiding pressure or fluid, and the control pistons (14) and the electromagnetic actuators (10) being spaced from one another such that the control pistons (14) are arranged along a first plane (21) and the electromagnetic (10) are arranged along a second plane (20) spaced from the first plane (21).

2. The externally fitted control device according to claim 1, further comprising that the space is separated by a separation wall (5) into first and second subspaces (6, 7), and the electronic control module (1) is positioned in the first subspace (6), and the hydraulic control module (2) is positioned in the second subspace (7).

3. The externally fitted control device according to claim 1, further comprising that the hydraulic control module (2) is connected with the transmission enclosure (9).

4. The externally fitted control device according to claim 2, further comprising that the separating wall (5) has at least one bracket to which the electronic control module (1) is attached.

5. The externally fitted control device according to claim 2, further comprising that the common control enclosure (3) has a cover which creates a wall in the space in which the electronic control module (1) is positioned.

6. A hydraulic control module in which the hydraulic control module (2) includes ducts (16, 17), for guiding pressure or fluid, electromagnetic actuators (10), and control pistons (14);
wherein the hydraulic control module (2) has a first surface (19) by which the hydraulic control module (2) is connectable with a transmission enclosure (9) and by which the ducts (17) guide the pressure or the fluid to the transmission enclosure (9), a first plane (21) is spaced from the first surface (19) and the electromagnetic actuators (10) are arranged along the first plane (21), and a second plane (20) is spaced from the first plane (21) and the first surface (19), and the control pistons (14) are arranged along the second plane (20).

7. The hydraulic control module according to claim 6, wherein ducts (17) for the control pistons (14) terminate at the second plane (20) and the ducts (16) for the electromagnetic actuators (10) terminate at the first plane (21).

8. The hydraulic control module according to claim 7, further comprising that the second plane can be sealed in a pressure tight manner by a cover (23).

9. The hydraulic control module according to claim 7, further comprising that at least several of the ducts (17), for the control pistons (14), and several ducts (16), for the electromagnetic actuators (10), are connected with one another.

10. The hydraulic control module according to claim 7, further comprising that the hydraulic control module (2) comprises a one-piece enclosure part which includes open ducts (16) which are sealed, on one hand, by a cover (23) and, on the other hand, by the transmission enclosure (9).

11. The hydraulic control module according to claim 7, further comprising that the hydraulic control module (2) comprises first and second enclosure parts (12, 13) which each include open ducts (16, 17) which are sealed, on one hand, by connection of the first and the second enclosure parts (12, 13) with one another and, on the other hand, by the transmission enclosure (9).

12. An externally fitted control device comprising:
an electronic control module (1) and a hydraulic control module (2);
the electronic control module (1) and the hydraulic control module (2) both being positioned in a common control enclosure (3);
the common control enclosure (3) being connected fluid tight with a transmission enclosure (9) so as to create a fluid tight space with respect to an external environment in which the electronic control module (1) and the hydraulic control module (2) are positioned;
the hydraulic control module includes ducts (16, 17), for guiding pressure or fluid, electromagnetic actuators (10), and control pistons (14);
the hydraulic control module (2) has a first surface (19) by which the hydraulic control module (2) is connectable with the transmission enclosure (9) and by which the ducts (17) guide the pressure or the fluid to the transmission enclosure (9), a first plane (21) is spaced from the first surface (19) and the electromagnetic actuators (10) are arranged along the first plane (21), and a second plane (20) is spaced from both the first plane (21) and the first surface (19), and the control pistons (14) are arranged along the second plane (20).

* * * * *